United States Patent
Kuwano et al.

(10) Patent No.: US 8,599,267 B2
(45) Date of Patent: Dec. 3, 2013

(54) TRACKING DEVICE, TRACKING METHOD, TRACKING DEVICE CONTROL PROGRAM, AND COMPUTER-READABLE RECORDING MEDIUM

(75) Inventors: Satoru Kuwano, Kyoto (JP); Takashi Kakiuchi, Kyoto (JP); Tomohiro Inoue, Kyoto (JP); Masahiro Senga, Kyoto (JP)

(73) Assignee: OMRON Corporation, Kyoto (JP)

( * ) Notice: Subject to any disclaimer, the term of this patent is extended or adjusted under 35 U.S.C. 154(b) by 805 days.

(21) Appl. No.: 12/282,632

(22) PCT Filed: Mar. 14, 2007

(86) PCT No.: PCT/JP2007/055066
§ 371 (c)(1),
(2), (4) Date: Sep. 11, 2008

(87) PCT Pub. No.: WO2007/119355
PCT Pub. Date: Oct. 25, 2007

(65) Prior Publication Data
US 2009/0096871 A1 Apr. 16, 2009

(30) Foreign Application Priority Data
Mar. 15, 2006 (JP) .................................. 2006-071861

(51) Int. Cl.
*G01S 15/89* (2006.01)
*H04N 7/18* (2006.01)

(52) U.S. Cl.
USPC ............................ 348/169; 348/135; 348/143

(58) Field of Classification Search
USPC .......................................... 348/169, 135, 143
See application file for complete search history.

(56) References Cited

U.S. PATENT DOCUMENTS

2004/0081338 A1 * 4/2004 Takenaka ...................... 382/118
2005/0057653 A1 3/2005 Maruya
(Continued)

FOREIGN PATENT DOCUMENTS

GB 2343945 A 5/2000
JP 04-126473 A 4/1992
(Continued)

OTHER PUBLICATIONS

Extended European Search Report issued in corresponding European Application No. 07738537.5 dated Apr. 17, 2013 (6 pages).
(Continued)

*Primary Examiner* — David Lazaro
(74) *Attorney, Agent, or Firm* — Osha Liang LLP

(57) ABSTRACT

A tracking device includes feature information detection means for detecting feature information from a photographic image and tracking object matching means for comparing the feature information with tracking object information in which feature information of a plurality of figures are registered so that the feature information corresponds to a priority indicating tracking order of the feature information and for determining whether or not the feature information is information of the tracking object. The tracking device also includes priority acquisition means for acquiring the priority of the feature information detected from the tracking object information where it is determined that the feature information detected is the information of the tracking object and control means for controlling the photographing section, based on the priority acquired, so as to continuously include, in the photographic image from which the feature information is detected, feature information that has a highest priority in the photographic image.

17 Claims, 7 Drawing Sheets

(56) References Cited

U.S. PATENT DOCUMENTS

| | | |
|---|---|---|
| 2005/0280711 A1 | 12/2005 | Ishii et al. |
| 2010/0254577 A1* | 10/2010 | Vanhoucke et al. .......... 382/118 |
| 2011/0096187 A1* | 4/2011 | Steinberg et al. .......... 348/222.1 |

FOREIGN PATENT DOCUMENTS

| | | |
|---|---|---|
| JP | 06-339056 A | 12/1994 |
| JP | 09-331520 A | 12/1997 |
| JP | 2000-163600 A | 6/2000 |
| JP | 2002-077887 A | 3/2002 |
| JP | 2003-324720 A | 11/2003 |
| JP | 2004-040514 A | 2/2004 |
| JP | 2004062560 A | 2/2004 |
| JP | 2005-020205 A | 1/2005 |
| JP | 2005-086626 A | 3/2005 |

OTHER PUBLICATIONS

Ukita et al., "Real-Time Cooperative Multi-Target Tracking by Communicating Active Vision Agents," Information Fusion, 2003. Proceedings of the Sixth International Conference of Jul. 8-11, 2003, Piscataway, NJ, USA, IEEE, vol. 1, Jul. 8, 2003, pp. 439-446 (8 pages).

* cited by examiner

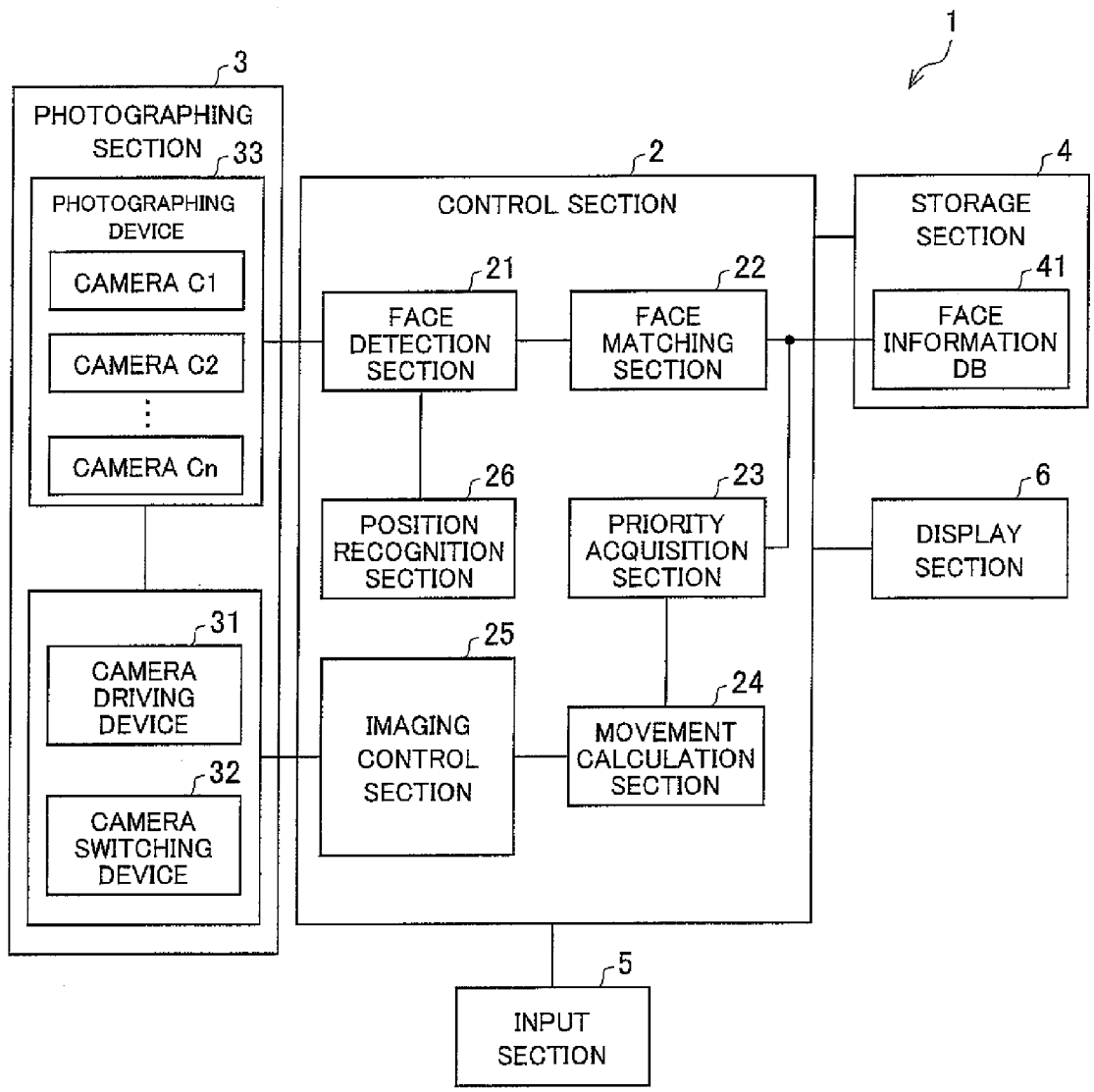

TRACKING DEVICE, TRACKING METHOD, TRACKING DEVICE CONTROL PROGRAM, AND COMPUTER-READABLE RECORDING MEDIUM

TECHNICAL FIELD

The present invention relates to a device which recognizes and tracks a position of a specific figure inside a photographic image.

BACKGROUND ART

In a conventional device which tracks a human figure in a photographic image, a tracking-objected person requires to wear a specific device such as a pulse transmission device or a GPS (global positioning system) device in order for the device to track a specific human figure (for example, see Patent Document 1 and 2). However, the following techniques do not require the tracking-objected person to wear the specific devices. More specifically, there is a technique where (i) a position of a face of a human figure is confirmed, and (ii) panning, tilting, and zooming of a security camera are controlled so that the face is positioned in the center of a screen, so as to trace a movement of the face. Further, in the technique, features of the face are extracted from the image, in order to compare the face with a face registered in a database. This is to see whether or not the face matches the face registered in the database, in order to recognize a specific individual (for example, see Patent Document 3). Moreover, there is a technique where face information of a human figure is acquired from an image, and the face information thus acquired is tracked by use of a plurality of cameras, when the human figure is or is not registered in a database (for example, see Patent Document 4). There is also another technique where (i) automatic tracking is carried out by tracing a subject (tracking object) that is designated by pointing on a screen, and (ii) a video camera is controlled so that the subject comes in a center of a monitor screen (for example, see Patent Document 5).

"Tracking" in the present specification indicates an action to keep, an image of a subject (tracking object) inside a photographic image (so that the subject is continuously captured in the image).

[Patent Document 1]
Japanese Unexamined Patent Publication No. 40514/2004 (Tokukai 2004-40514) (published on Feb. 5, 2004)

[Patent Document 2]
Japanese Unexamined Patent Publication No. 20265/2005 (Tokukai 2005-20205) (published on Jan. 20, 2005)

[Patent Document 3]
Japanese Unexamined Patent Publication No. 163600/2000 (Tokukai 2000-163600) (published on Jun. 16, 2000)

[Patent Document 4]
Japanese Unexamined Patent Publication No. 324720/2003 (Tokukai 2003-324720) (published on Nov. 14, 2003)

[Patent Document 5]
Japanese Unexamined Patent Publication, No. 339056/1994 (Tokukaihei 6-339056) (published on Dec. 6, 1994)

DISCLOSURE OF INVENTION

In a case where there are a plurality of human figures which are subject to tracking, the conventional techniques do not have means to automatically switch a tracking object when a human figure having a higher tracking priority than the human figure that is currently tracked comes into an image (frame in). Therefore, when the human figure having the higher tracking priority comes into the image while another human figure is tracked, a user, for example an observer, requires to carry out a switching operation of the tracking object, by designating the human figure which is to be tracked by, for example, pointing the human figure on a screen on which the photographic image is displayed. As such, when there is an order of priority in tracking the tracking objects, the user has to go to the trouble of switching the tracking object. Moreover, it is unknown when an object having a higher priority in the tracking order comes into the photographic image. Therefore, the user has to constantly watch the screen on which the photographic image is displayed.

The present invention is attained in view of the above problem, and its object is to realize a tracking device, a tracking method, a tracking device control program, and a computer-readable recording medium, each of which can autonomously track a tracking object, not having to cause trouble to a user even in a condition where a figure prioritized in tracking order is included in an image.

In order to attain the object, a tracking device according to the present invention tracks a tracking object by controlling a photographing section so as to continuously include the tracking object in a photographic image, the tracking device including: feature information detection means for detecting feature information from the photographic image; tracking object matching means for (i) comparing the feature information thus detected with tracking object information in which feature information of a plurality of figures are registered so that the feature information corresponds to a priority indicating tracking order of the feature information, and (ii) determining whether or not the feature information thus detected is information of the tracking object; priority acquisition means for acquiring the priority from the tracking object information, in the case where it is determined that the feature information thus detected is the information of the tracking object; and control means for controlling the photographing section, based on the priority thus acquired, so as to continuously include, in the photographic image from which the feature information is detected, feature information that has a highest priority in the photographic image.

In order to attain the object, a tracking method according to the present invention is a method which tracks a tracking object by controlling a photographing section so as to continuously include the tracking object in a photographic image, the tracking method including the steps of: detecting feature information from the photographic image; comparing the feature information thus detected with tracking object information in which feature information of a plurality of figures are registered so that the feature information corresponds to a priority indicating tracking order of the feature information; determining whether or not the feature information thus detected is information of the tracking object; acquiring the priority of the feature information thus detected from the tracking object information, in the case where it is determined that the feature information thus detected is the information of the tracking object; and controlling the photographing section, based on the priority thus acquired, so as to continuously include, in the photographic image from which the feature information is detected, feature information that has a highest priority in the photographic image.

According to the arrangement and the method, when feature information included in a photographic image is detected, and the feature information thus detected is information of a tracking object, a priority indicative of a tracking order of the feature information thus detected is acquired. Acquisition of the priority is carried out for feature information which has been determined as information of the tracking object. As a result, photographing can be carried out by controlling the photographing section so that the tracking device continuously includes, in the photographic image from which the feature information is detected, the feature information having a highest priority, based on the priority thus acquired, even in the case where a plurality of feature information are included in the photographic image. This allows continuous tracking of the feature information having the highest priority. Here, the priorities are expressed by numerals for example, and may be handled as a smaller numeral expression in priority of the feature information denoting a higher priority. For example, if there are priorities that are expressed by numerals 1, 2 and 3, the priorities of these decrease in the order of 1, 2, and 3, i.e., 1>2>3. Of course, how the feature information is prioritized is not limited to this. Note that "tracking" denotes an action to keep an image of a subject (tracking object) inside a photographic image (so as to continuously capture the subject within the image).

Of course, if there is only one feature information that is prioritized in the tracking object information, that prioritized feature information is continuously tracked. Priority is also acquired in a case where there is just one feature information registered in the tracking object information. In such case, the one feature information is considered to have the highest priority, even if the feature information is actually not prioritized. If just a part of a plurality of the feature information is prioritized whereas the rest of the feature information are not prioritized, priority may be acquired on the basis that the rest of the feature information is considered to equally have a lowest priority.

Controlling of the photographing section is preferably carried out, for example, by controlling operations of a camera which is a photographing device, more specifically, controlling operations such as (i) panning/tilting and zooming that are carried out by moving a position of a camera horizontally, vertically, or forward and back, (ii) changing of exposure, or (iii) switching of cameras in the case where there are a plurality of imaging cameras. The position of the camera may be moved, for example, by placing the photographing camera on a stand positioned on a rail. Of course, the photographing section may be controlled in any way as long as the feature information having the highest priority is continuously included in the photographic image.

The operations of the camera are preferably controlled so as to be carried out when there is a change to the feature information having the highest priority in the photographic image, more specifically, when there is a change to the feature information having the highest priority in at least one of a position (the position change may be to one part of the feature information), size, tilt, and orientation of the feature information. Of course, the camera may be controlled so that the camera is operated based on other changes than the above.

Furthermore, according to the arrangement and the method, the photographing section is controlled so as to continuously include, in the photographic image from which the feature information is detected, feature information that has a highest priority in the photographic image. Therefore, even if the feature information having the highest priority is no longer tracked since the feature information having the highest priority has moved outside of a range in which the photographing section can track an image for example, it is possible to track the feature information having the highest priority in the photographic image at that time (feature information having a higher priority second to the feature information which is no longer tracked).

As the above, according to the arrangement and the method, the photographing section is controlled so that the tracking device continuously tracks the feature information having the highest priority, even if there is a plurality of tracking objects and a tracking order is given to the tracking objects. Therefore, the tracking device is capable of tracking the feature information having the highest priority in the photographic image, without requiring an operation from the user. Therefore, it is unnecessary for the user to specify the tracking object. As a result, the operations taken by the user are reduced. As such, the arrangement and the method allow autonomous tracking of the feature information, not having to cause trouble to the user, even if a figure that is prioritized in tracking order is included in the image.

In addition to the above arrangement, with the tracking device according to the present invention, the feature information may be face information which specify features of a face of a figure.

Face information excels in distinguishing a subject in order to specify an individual. According to the arrangement, if the feature information is face information, authentication is easily carried out at the time of matching. The face information allows easy identification of an individual. Therefore, for example, tracking of players in sports relay broadcasting such as baseball and soccer is possible in an order of popularity, by prioritizing face information of the players.

Of course, the feature information is not necessarily the face information of a face of a human figure, as long as subjects are distinguishable between each other. For example, the feature information is information of an external appearance of a car. In such a case, it is possible to track cars in an order of popularity in relay broadcasting of an automobile race by prioritizing the cars, for example. If the feature information is for example information of a face of a horse, it is possible to track a horse in relay broadcasting of horse racing in order of popularity, by prioritizing the horses. Note that the above are simply exemplifications.

In addition to the above arrangement, the tracking device according to the present invention further includes position recognition means for continuously recognizing, in the photographic image, a position of the feature information thus detected by the feature information detection means, wherein the tracking object matching means skips the matching when (i) the feature information detection means detects same feature information, in a photographic image which is subsequently obtained, as the feature information which has been detected by the feature information detection means, and (ii) the position recognition means recognizes the position of the feature information in the photographic image.

According to the arrangement, matching by the tracking object matching means is not carried out in a case where same feature information is detected in a photographic image which is subsequently obtained, as the feature information which has been detected by the feature information detection means, and a position of the feature information is recognized by the position recognition means. That is to say, position recognition (tracing) of feature information other than feature information of a current tracking object which has the highest priority is carried out. This allows reduction of a number of times of which the matching is carried out by the tracking object matching means. As a result, it is possible to reduce burden on the tracking device.

In addition to the above arrangement, the tracking device according to the present invention is arranged such that the photographing section includes a plurality of photographing devices, and the control means may control the photographing section so that, when one of the photographing devices that has tracked feature information having the highest priority can no longer track the feature information having the highest priority, other one of the photographing devices that can track the feature information having the highest priority tracks the feature information having the highest priority.

According to the arrangement, when the photographing device that has tracked the feature information having the highest priority can no longer track the feature information having the highest priority, another photographing device that can track the feature information having the highest priority can track the feature information having the highest priority. At this time, presumption in movement of the feature information in advance allows a smooth switching of photographing from a photographing device which has tracked the feature information having the highest priority to another photographing device, without losing track of the feature information having the highest priority.

According to the arrangement, it is possible to track the feature information having the highest priority by use of a plurality of photographing devices that have different angle of views. Therefore, it is possible to track the feature information having the highest priority, for example feature information of a specific figure, in a broad range.

The tracking device according to the present invention, in addition to the above arrangement, may include an input section via which a user is able to set and change a priority in the tracking object information.

According to the arrangement, a user can input, to the tracking device, settings and changes of the priority in the tracking object information. The priority is assumed to be set corresponding to feature information registered to the tracking object information in advance. The priority is preferably changeable as required. Of course, if the priority is not set in advance, the tracking device may be arranged such that the priority is to be set in the case the tracking device detects feature information that is not prioritized. If the tracking device detects feature information that is not registered in the tracking object information, the feature information may be registered in the tracking object information together with a respective priority.

For example, in sports relay broadcasting, it is possible to track a player in an order of popularity by prioritizing a plurality of players for example. The priority can be changed as necessary. In a case where a reserve player joins the game or the like, a new priority may be registered in order to carry out tracking. These are simply exemplifications.

In the case where the tracking device detects the feature information that is not registered in the tracking object information, the feature information is to be registered in the tracking object so as to allow the user to set the priority.

In addition to the above arrangement, the tracking device according to the present invention may be arranged such that the tracking object matching means (i) finds a similarity between the feature information detected by the feature information detection means and the feature information included in the tracking object information, (ii) determines, in a case where the similarity thus found is greater than a predetermined authentication threshold value, that the feature information thus detected is information of a tracking object, and (iii) finds authentication reliability indicative of how large the similarity thus found is as compared with the predetermined authentication threshold value; and in a case where the photographic image includes a plurality of feature information having an identical priority, the control means controls the photographing section so that one of the plurality of feature information, which has a greater authentication reliability, is continuously included in the photographic image.

According to the arrangement, a similarity is found between the feature information thus detected and feature information included in the tracking object information. If the similarity thus found is greater than a predetermined authentication threshold value, it is determined that the feature information thus detected is information of a tracking object. Furthermore, authentication reliability is found. This allows continuously including, in the photographic image, the feature information that has a greater authentication reliability in the case where a plurality of feature information that have an identical priority is included in the photographic image.

Therefore, even if a plurality of feature information that have the identical priority is included in the photographic image, it is possible to determine an object and track the feature information of the object to be always included in the photographic image. Determination of the object which is to be continuously included in the photographic image is dependent on the authentication reliability. Therefore, it is possible to further reliably track the tracking object.

In addition to the above arrangement, the tracking device according to the present invention is arranged such that the control means controls the photographing section so that at least one of a size and a position of the feature information that has the highest priority is always fixed in the photographic image.

According to the arrangement, at least one of a size and a position of the feature information having the highest priority is always fixed in the photographic image. The feature information that is in a stable size in the photographic image makes it easier to find the feature information having the highest priority, in the photographic image. A stable position of the feature information allows finding the feature information having the highest priority just by looking at a fixed position, for example, a center of a monitor on which the photographic image is displayed. As such, it is possible to easily carry out surveillance of the feature information having the highest priority by having at least one of the size and the position of the feature information having the highest priority fixed in the photographic image.

The tracking device may be realized by a computer. In such a case, a computer-readable recording medium which records a tracking device control program, which program causes the computer to operate as each of the aforementioned means so as to realize the tracking device, is also within the scope of the present invention.

As described above, the tracking device in accordance with the present invention includes: feature information detection means for detecting feature information from the photographic image; tracking object matching means for (i) comparing the feature information thus detected with tracking object information in which feature information of a plurality of persons are registered so that the feature information corresponds to a priority indicating tracking order of the feature information, and (ii) determining whether or not the feature information thus detected is information of the tracking object; priority acquisition means for acquiring the priority from the tracking object information, in the case where it is determined that the feature information thus detected is the information of the tracking object; and control means for controlling the photographing section, based on the priority thus acquired, so as to continuously include, in the photographic image from which the feature information is detected, feature information that has a highest priority in the photographic image.

According to the arrangement, when feature information that is included in a photographic image is detected, and the feature information thus detected is information of a tracking object, a priority, which indicates a tracking order of the feature information thus detected, is acquired. Acquisition of the priority is carried out for feature information which has been determined as the tracking object. Therefore, it is possible to carry out photographing by controlling the photographing section so that the tracking device continuously includes, in the photographic image from which the feature information is detected, the feature information having a highest priority, based on the priority thus acquired, even if a plurality of feature information are included in the photographic image. This allows continuous tracking of the feature information having the highest priority. Of course, if there is only one feature information that is prioritized in the tracking object information, that prioritized feature information is continuously tracked.

Furthermore, according to the arrangement, the photographing section is controlled so as to continuously include, in the photographic image from which the feature information is detected, feature information that has a highest priority in the photographic image. Therefore, even if, for example, the feature information having the highest priority is no longer tracked since the feature information has moved outside of the range in which the photographing section can track an image, it is possible to track the feature information having a highest priority in the photographic image at that time (feature information having a higher priority second to the feature information which is no longer tracked).

As the above, according to the arrangement, the photographing section is controlled so that the tracking device continuously tracks the feature information having the highest priority, even if there is a plurality of tracking objects and a tracking order is provided to the tracking objects. Therefore, the tracking device is capable of tracking feature information having the highest priority in the photographic image, without requiring an operation from the user. Therefore, it is unnecessary for the user to specify the tracking object. As a result, the operations by the user are reduced. As such, the arrangement allows autonomous tracking, not having to cause trouble to the user, even if a figure that is prioritized in tracking order is included in an image.

BRIEF DESCRIPTION OF DRAWINGS

FIG. 1 illustrates an embodiment of the present invention, and is a block diagram illustrating an essential arrangement of a tracking device.

FIG. 2 is an explanatory view illustrating one example of a face information database, in a form of a graph.

REFERENCE NUMERALS

Figure 3:
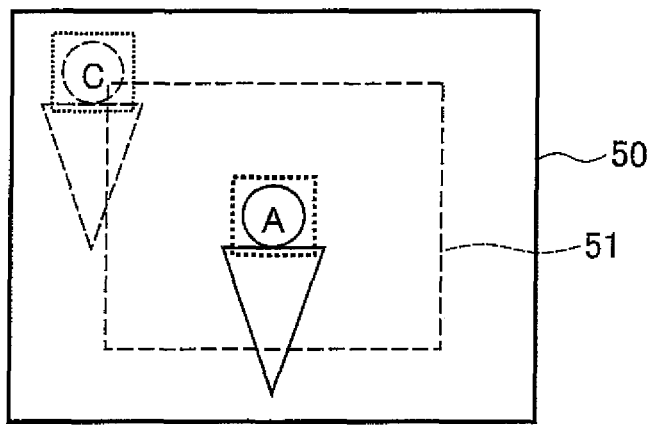
FIG. 3(a) is an image view illustrating a switching of a tracking object.
FIG. 3(b) is an image view illustrating a switching of a tracking object.
FIG. 3(c) is an image view illustrating a switching of a tracking object.
Figure 3:
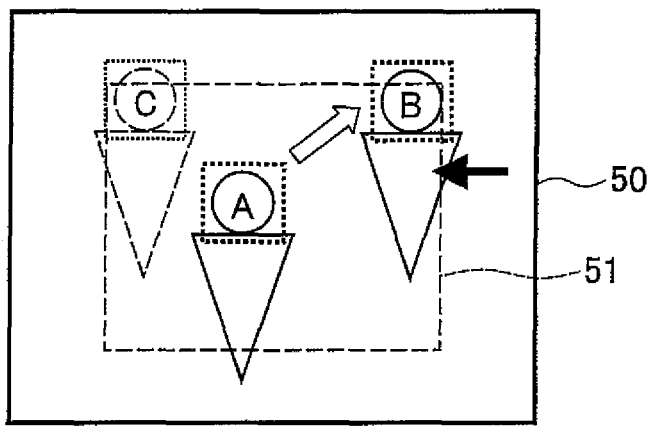
Figure 3:
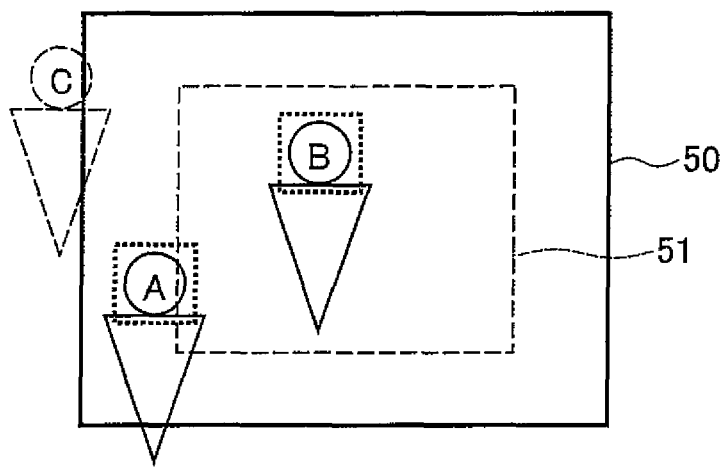

1 Tracking device
2 Control section
3 Photographing section
4 Storage section
5 Input accepting section
6 Display section
21 Face detection section (feature information detection means)
22 Face matching section (tracking object matching means)
23 Priority acquisition section (priority acquisition means)
24 Movement calculation section
25 Photographing control section (control means)
26 Position recognition section (position recognition means)
33 Photographing device
41 Face information database (tracking object information)

BEST MODE FOR CARRYING OUT THE INVENTION

One embodiment of the present invention is described below with reference to FIGS. 1 through 8. The following description explains a tracking device of the present embodiment, which in order to track a specific object, recognizes feature information included in a photographic image as face information of a figure (human or thing), and matches the face information. However, the feature information may be any kind of information, as long as a subject that is included in the photographic image is distinguishable.

[Arrangement of Tracking Device]

A tracking device 1 of the present embodiment includes a control section 2, a photographing section 3, a storage section 4, an input section 5, and a display section 6.

The control section 2 has a microcomputer built therein. Based on a computer program, the control section 2 operates by receiving an input operation or the like from the input section 5. The control section 2 controls operations of various arrangements in the tracking device 1 as a whole. The control section 2 functions as a face detection section 21, a face matching section 22, a priority acquisition section 23, a movement calculation section 24, a photographing control section 25, and a position recognition section 26.

The face detection section 21 detects face information (face) that is included in a photographic image taken by the photographing section 3.

The face matching section 22 compares the face information detected by the face detection means with a face information database (DB) 41. In the face information DB 41, face information of a plurality of persons is registered, which face information corresponds to a priority indicating tracking order of the face information. Subsequently, the face thus detected is determined whether or not the face is a tracking object. Here, face information denotes a face image. In this case, a conventionally known method such as an eigenface method, an LFA (Local Feature Analysis) method, a graph matching method, a neural network method, a constrained mutual subspace method, a perturbation space method, or a frequency analysis method is to be used for determining sameness between the face images by comparing the face images.

For example, the sameness of the face images is determined as follows. Feature amount in a face image is found by use of Gabor-wavelet transform or the like. Subsequently, similarity between the feature amount in the face image and the feature amount registered on the database is found. Thus, the sameness is determined. If the similarity exceeds a threshold value set in advance, the two faces are determined as the same face. As such, the sameness of the face images can be determined by comparing the face images. Note that a determination method is not limited to this.

The face matching section 22 finds the similarity between the face information and face information included in the face information DB 41. If the similarity thus found is greater than a predetermined authentication threshold value, the face detection section 21 determines that the face information thus detected is a tracking object. Furthermore, the face matching section 22 finds authentication reliability, based on how greater the similarity thus found is from the predetermined authentication threshold value.

The priority acquisition section 23 acquires a priority of the face information thus detected from the face information DB 41.

The movement calculation section 24 measures a movement of the face information that has a highest priority of the face information thus detected, and calculates an amount of the movement of the face information having the highest priority. Calculation of the amount of the movement by the movement calculation section 24 may be carried out by, for example, well-known methods such as Patent Document 5.

The photographing control section 25 controls the photographing section 3 so that the face information having the highest priority is continuously included in the photographic image from which the face information is detected. Controlling of the photographing section 3 is carried out by following the movement of the face information having the highest priority, based on the amount of movement calculated by the movement calculation section 24. The controlling of the photographing section 3 is preferably carried out, for example, by controlling operations of a camera which is a photographing device 33, more specifically, (i) controlling operations such as panning/tilting and zooming, that are carried out by moving a position of a camera horizontally, vertically, or forward and back, (ii) changing in exposure, or (iii) switching of cameras in the case where there are a plurality of photographing cameras. The position of the camera may be moved, for example, by placing the photographing camera on a stand positioned on a rail. Of course, the photographing section 3 may be controlled in any way as long as the face information having the highest priority is continuously included in the photographic image.

It is preferable for the photographing section 3 to be controlled so that the operation of the camera is carried out when there is a change to the face information having the highest priority in the photographic image, more specifically, when there is a change to the face information having the highest priority, to at least one of a position (the change may be to one part contained in the face information, for example, a position of an eye), size, tilt, and a facing direction of the face information. Of course, the photographing section 3 may be controlled so that the camera is operated based on other changes than the above.

The photographing control section 25 may control the photographing section 3 so that at least one of the size and the position of the face having the highest priority is fixed in the photographic image. Of course, the face having the highest priority may be tracked just so as to keep the face inside the photographic image. However, the face at a stable size in the photographic image makes it easier to find the face having the highest priority in the photographic image. A stable position of the face allows finding the face information having the highest priority just by looking at a fixed position, for example, a center of a display screen on which the photographic image is displayed. Of course, the position is not limited to the center. As such, it is possible to easily carry out surveillance of a face having the highest priority by having at least one of the size and the position of the face having the highest priority fixed in the photographic image.

The position recognition section 26 continuously recognizes the face information (face) in the photographic image which face information (face) is detected by the face detection section 21, by continuously updating a coordinate (position of the face) of an image indicating face coordinate information. The face coordinate information is stored in a face position storage area (memory) in the tracking device (not illustrated). The face coordinate information is information indicating a position of the face information (face) thus detected by the face detection section 21. When (i) the face detection section 21 detects same face information, in a photographic image which is subsequently obtained, as the feature information which has been detected by the face detection section 21, and (ii) the position recognition section 26 recognizes the position of the face information in the photographic image, the face matching section 22 does not access the face information DB 41. That is to say, positions of face information other than the current tracking object which has the face information having the highest priority is also recognized (traced). This allows reduction of a number of times of which matching is carried out by the face matching section 22. As a result, it is possible to reduce burden on the tracking device 1.

The photographing section 3 includes the photographing device 33 which has a plurality of cameras, a camera driving device 31, and a camera switching device 32. The photographing section 3 photographs an image of the tracking object based on the control by the photographing control section 25. The camera driving device 31 drives the cameras in the photographing device 33. The camera switching device 32 switches the camera which is to be driven. Each of the cameras in the photographing device 33 can carry out panning/tilting, zooming, and changing of exposure.

The present embodiment is illustrated having a plurality of cameras, however the number of cameras may be one. In such case, the camera switching device 32 is not necessarily provided. The tracking device 1 may be arranged so that there are a plurality of tracking devices 1 which control one or more cameras. In this case, the tracking devices may track the face having the highest priority by use of a communications section provided to each of the tracking devices.

The storage section 4 is made of a non-volatile storage device such as a hard disk. The storage section 4 stores the face information DB 41. In the face information DB 41, face information of a plurality of persons is registered corresponding to a priority indicating a tracking order of the face information.

For example, with reference to FIG. 2, face information of a person A and face information of a person B that have a priority of 1 and 2, respectively, is registered in the face information DB 41. A smaller numeral expression of the priority indicates a higher priority. FIG. 2 has just two persons registered as tracking objects, however more face information may be registered. Moreover, not just registering one face information for a tracking object but registration of a plurality of face information (for example, the face information which faces front, right, left, up, and down) for a tracking object allows accurate matching by the face matching section 22. Information related to the tracing object such as a name and feature points of the tracking object (for example, in the case where the tracking object is a baseball player, a fielding position or the like) may be registered in the face information DB 41. Having such information registered in the face information DB 41 allows users to refer to the information when setting and changing the priority. Therefore, this information becomes help for the user.

Of course, if there is just one face information that is prioritized in the face information DB 41, the face information thus prioritized is continuously tracked. The priority is also acquired in the case where there is just one face information registered in the face information DB 41. In such case, the one face information is considered to have the highest priority, even if the face information is not prioritized. If just a part of a plurality of the face information is prioritized whereas the rest are not prioritized, the priority may be acquired on the basis that the rest of the face information is considered to equally have the lowest priority.

The storage section 4 may be stored with a control program which controls operations of various arrangements in the tracking device 1, an OS (operating system) program, or other various programs.

The input section 5 is an interface of the tracking device 1 for accepting operations from a user. The input section 5 is provided so as to enable the user to operate the tracking device 1. For example, the input section 5 is provided so that the user can input settings and changes to the priority in the face information DB 41. Therefore, the user can set and change the priority of the face information registered in the face information DB 41 in advance, via the input section 5. If the priority is not set in advance, the tracking device 1 may be arranged such that a priority is set in the case the tracking device 1 detects face information that is not prioritized. If the tracking device detects face information that is not registered in the tracking object information, the face information may be registered in the tracking object information together with a priority. For example, in sports relay broadcasting, it is possible to track a player in an order by popularity by prioritizing the players for example. This priority can be changed as necessary. In a case where a reserve player joins the game or the like, a new priority may be registered in order to carry out tracking. These are simply exemplifications. In the case where the tracking device 1 detects the face information not registered in the tracking object information, the face information is to be registered in the tracking object so as to allow the user to set the priority.

The input section 5 is provided so that, for example, operation keys/buttons and the like are used in order for the user to operate the input section 5. The user gives, via the input section 5, various instructions to the tracking device 1, for example start and stop of the tracking operation, rewriting of the face information DB 41, and setting and changing the priority in the face information DB 41. The input section 5 may be combined with the display screen of the display section 6. That is, for example, the input section 5 and the display screen of the display section 6 may be provided as an integrated touch panel. In such a case, items of which the user can input are displayed on the display screen so that the user can give instructions to the tracking device 1 by touching the display area of the desired item. Operation means of a stick-shape may be provided as the input section 5, in order to touch the display area.

The display section 6 includes a display screen (photographic screen), and outputs (displays) a photographic image photographed by the photographing device. A plurality of display sections 6 may be provided. For example, a same number of display sections 6 as the number of cameras may be provided. The display screen of the display section 6 may be partitioned so that images from a plurality of cameras are displayed on the display section 6.

Moreover, for example, an audio output section (not illustrated) may be provided, which audio output section outputs audio accompanying the photographic image photographed by the imaging device 33.

The face matching section 22 and the face information DB 41 may be provided as an external apparatus. In such a case, matching process is carried out by carrying out communications between the tracking device 1 and the external apparatus.

The tracking device of the present invention does not necessarily include the photographing section 3 or the face information DB 41; the control section 2 may be considered as the tracking device according to the present invention.

The following description explains a state where tracking is carried out by use of the tracking device 1 that has the above arrangement, with reference to FIGS. 3(a) through 3(c). Assume that, as illustrated in FIG. 2, face information of a person A and a person B are registered in the face information DB 41 prioritized as 1 and 2, respectively. A smaller numerical priority indicates a higher priority.

First, as illustrated in FIG. 3(a), assume that (a face of) a human figure A is being tracked in a photographic image 50. Here, a human figure C is not registered in the face information DB 41. Therefore, the human figure C is not a tracking object. Accordingly, a face position of the human figure C is recognized by the position recognition section 26 as a tracing object, however tracking is not carried out.

Next, as illustrated in FIG. 3(b), assume that the human figure B comes into the photographic image 50 (frame in, black arrow in figure), which human figure B has a higher priority in tracking order than the human figure A. In this case, the tracking object is switched from the face of the human figure A to the face of the human figure B (white arrow in figure). Meanwhile, the face of the human figure C is not the tracking object, so just the face position is recognized. The human figure B becomes the tracking object, and while the face of the human figure B stays in the photographic image 50, just the position of the face of the human figure A is recognized as a tracking object that has a lower priority (tracing object).

Thereafter, as illustrated in FIG. 3(c), the face of the human figure B, as the tracking object, is made to stay in a certain range 51 of the photographic screen which displays the photographic image 50. Moreover, the position of the face of the human figure A is continuously checked (recognized) while the face of the human figure A is included in the screen, as the face that has the lower priority (tracing object). In such a condition, if the face of the human figure B disappears from the photographic image 50 due to some kind of cause, the face of the human figure A again becomes the tracking object. Meanwhile, the face of the human figure C has moved outside of the image (frame out). This ends the recognition (trace) of the face position of the human figure C.

The above explanation of the tracking state is made by use of one camera that carries out the tracking. However, the number of cameras may be one camera or several cameras.

Figure 4:
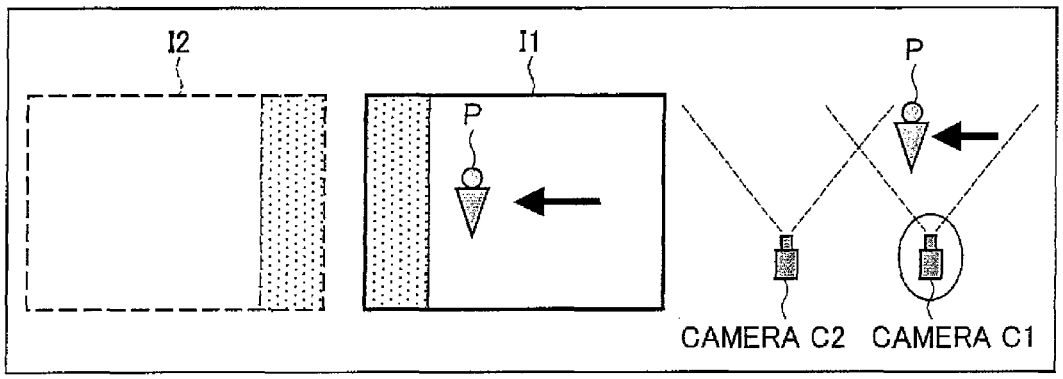
FIG. 4(a) is an image view illustrating a switching of a camera.
FIG. 4(b) is an image view illustrating a switching of camera.
FIG. 4(c) is an image view illustrating a switching of camera.
Figure 4:
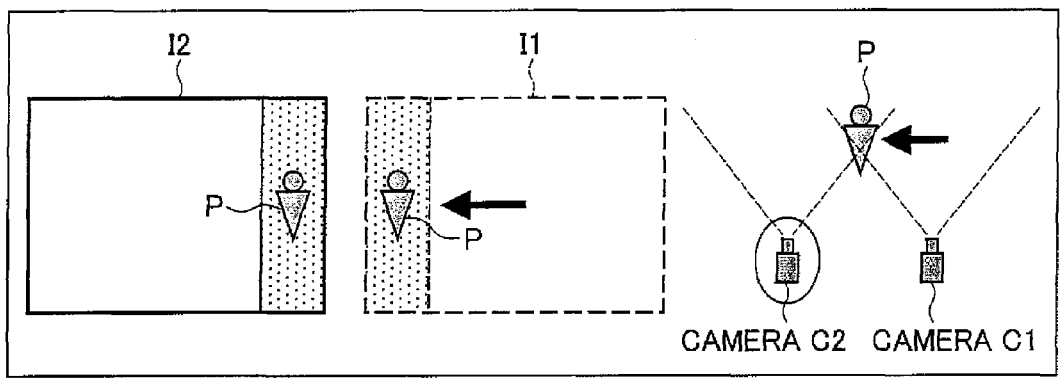
Figure 4:
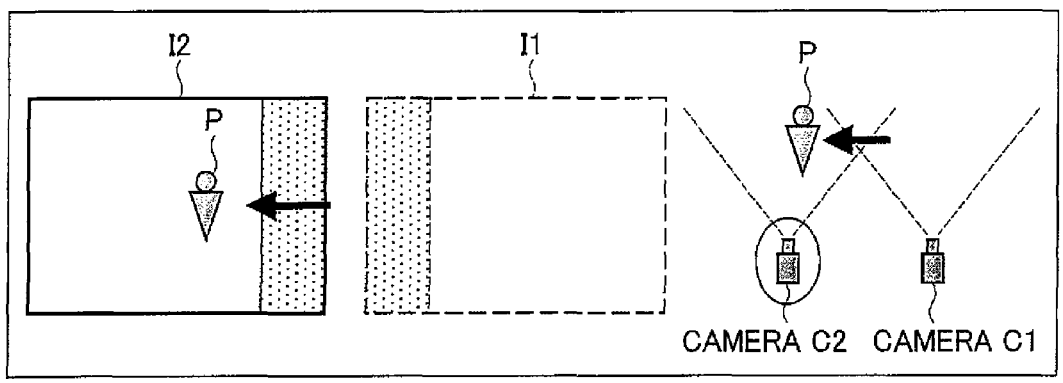

The following description explains switching of cameras in the photographing section 3, with reference to FIGS. 4(*a*) through 4(*c*). Here, assume that switching is carried out from a camera C1 to a camera C2. Each of FIGS. 4(*a*) through 4(*c*) illustrate, from left to right, an image I2 photographed by the camera C2, an image I1 photographed by the camera C1, and a positional relationship between imaging ranges of the cameras C1 and C2 and a subject. In addition, the dotted areas in the images I1 and I2 illustrated in FIGS. 4(*a*) through 4(*c*) are areas where the angle of view of cameras C1 and C2 overlap.

As illustrated in FIG. 4(*a*), when a face of a human figure P, which human figure P is a tracking object, is in an angle of view of the camera C1, the camera C1 tracks the face of the human figure P.

In FIG. 4(*b*), it is assumed that the human figure P, which is the tracking object, is to come off from the angle of view of the camera C1, based on a calculation by the movement calculation section 24. When the human figure P, which is the tracking object, comes into the angle of view of the camera C2, a screen changes its displayed image from the image I1 which is an image photographed by the camera C1 to the image I2 which is an image photographed by the camera C2. The photographing control section 25 controls the camera switching device 32, so as to control the switching of the cameras.

Subsequently, as illustrated in FIG. 4(*c*), when the human figure P, which is the tracking object, is in the angle of view of the camera C2, the camera C2 tracks the face of the human figure P.

As the above, in the tracking device 1, the photographing section 3 is controlled so that the face having the highest priority is continuously included in the photographic image, even if there is a plurality of tracking objects and a tracking order is given to the tracking objects. Therefore, the tracking device 1 can track a face having the highest priority, without requiring an operation from the user. Therefore, it is unnecessary for the user to specify the tracking object. As a result, the operations taken by the user are reduced. As such, use of the tracking device 1 allows autonomous tracking of the tracking object, not having to trouble the user, even if a human figure that is prioritized in tracking order is included in the image.

[Tracking Process by the Tracking Device]

Figure 5:
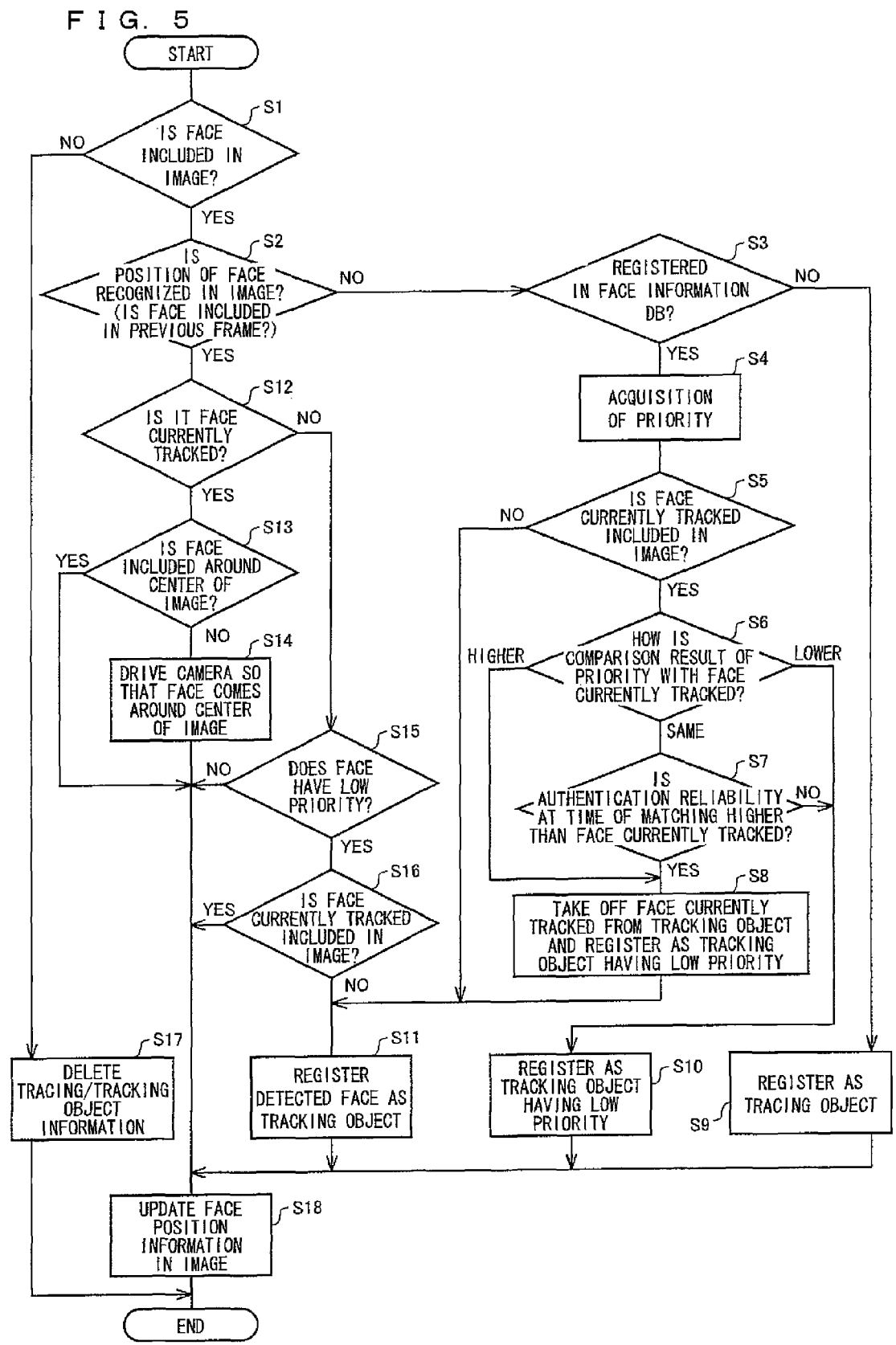
FIG. 5 is a flow chart illustrating a flow of a tracking process in a tracking device of the present embodiment.

The following description explains a flow of tracking processes in the tracking device 1, with reference to the flow chart shown in FIG. 5. Assume that, prior to the processes explained below, prioritized face information is registered in the face information DB 41.

First, the face detection section 21 detects face information (hereinafter abbreviated to as "face") in a photographic image so as to determine whether or not a face is in the photographic image (step 1, hereinafter abbreviated to as like S1). Detection of the face may wait until a subject comes into the photographic image. The camera may rotate so as to include the subject in the photographic image otherwise, and subsequently start the detection when the subject comes into the photographic image.

When a face is detected (YES in S1), the face detection section determines whether the face thus detected is one which its position is recognized in the image (whether the face is in a previous frame) (S2).

An explanation dealing with the case where the face thus detected in S1 is a face in which its position is not recognized in the image (NO in S2) is explained first, and the case where the face thus detected in S1 is a face in which its position is recognized (YES in S2) is explained thereafter.

If the face thus detected in S1 is a face of which its position is not recognized in the image (NO in S2), the face matching section 22 checks the face information DB 41 so as to determine whether or not the face detected in S1 is registered in the face information DB 41 (S3). The determination is carried out as follows. A similarity between the face thus determined and the face information included in the face information DB 41 is found. If the similarity thus found is greater than a predetermined authentication threshold value, it is determined that the face thus determined is information of a tracking object. Furthermore, authentication reliability is found from how greater the similarity is than the authentication threshold value.

When the face thus detected in S1 is registered (YES in S3), the priority acquisition section 23 acquires a priority of the face thus detected in S1 (S4). Once the priority is acquired, it is determined whether or not the face currently tracked (face having the highest priority) is included in the image (S5). If the face currently tracked is included in the image (YES in S5), the priority of the face thus detected in S1 and the face currently tracked are compared (S6). In the case where the priority of the face thus detected in S1 and the priority of the face currently tracked are the same, it is determined whether or not the authentication reliability thus found at a time when determination is made in S3 is higher than the authentication reliability of the face currently tracked (S7). The authentication reliability of the face currently tracked is stored in a memory or the like not illustrated.

As a result of comparing the authentication reliabilities of the two faces, in the case where the authentication reliability of the face thus detected in S1 is high (YES in S7), the face that is the information of the current tracking object is taken off the tracking object. The face that is the information of the current tracking object is then registered as information of a tracking object having a low priority in the memory or the like not illustrated (S8). Also in the case where, in S6, the face thus detected in S1 has a higher priority than the face that is currently tracked, the process proceeds to S8, where the face that is the information of the current tracking object is taken off the tracking object, and is registered as the information of the tracking object having the low priority in the memory or the like not illustrated.

In S6, if the face thus detected in S1 is lower in priority than the face that is currently tracked, the face thus detected in S1 is registered as the information of the tracking object having the low priority in the memory or the like not illustrated (100). Subsequently, the process proceeds to S18. In S7 also, if the face thus detected in S1 has the lower authentication reliability than the face that is currently tracked (NO in S7), the face thus detected in S1 is registered as the information of the tracking object having the low priority in the memory or the like not illustrated (S10). The process thus proceeds to S18.

If the face thus detected in S3 is not registered (NO in S3), the face thus detected in S1 is registered as information of a tracing object in the memory or the like not illustrated (S9). The process thus proceeds to S18.

If the face currently tracked is not included in the image (NO in S5), a face objected for process (here, the face thus detected in S1) is registered as the information of the tracking object in the memory or the like not illustrated (S11). The process thus proceeds to S18. Similarly, after the face which is the information of the current tracking object is registered as the information of the tracking object having the low priority in the memory or the like not illustrated (S8), the process proceeds to S11, in order to register the face objected for process (here, the face thus detected in S1) as the information of the tracking object in the memory or the like not illustrated, and proceeds to S18.

If the face thus detected in S1 is a face of which its position is recognized in the image (YES in S2), it is determined whether or not the face is the face that is currently tracked (S12). If the face is the face that is currently tracked (YES in S12), it is determined whether or not the face thus detected (the face that is currently tracked) is positioned around a center of the image (S13). If the face thus detected is not positioned around the center of the image (NO in S13), the photographing control section 25 controls the photographing section 3 so that the face thus detected comes around the center of the image (S14). If the face thus detected is positioned around the center of the image (YES in S13), or, after the imaging control section 25 controls the photographing section 3 so that the face thus detected comes around the center of the image (S14), the process proceeds to S18.

In S12, if the face thus detected in S1 is not the face that is currently tracked (NO in S12), it is determined whether or not the face thus detected in S1 is a face having the low priority (information of a tracking object not having a high priority) (S15). If the face is of the low priority (YES in S15), it is determined whether or not the face that is currently tracked is in the image (S16). If (i) the face is not a face having the low priority (NO in S15) or (ii) the face currently tracked is in the image (YES in S16), the process proceeds to S18. Note that, if the face is one which is not of the low priority in S15, the face is a tracing object.

If the face that is currently tracked is not in the image in S16 (NO in S16), the face thus detected in S1 is registered as the information of the tracking object in the memory or the like not illustrated (S11). The process thus proceeds to S18.

Finally, face position information is updated by rewriting a coordinate (position of face) in an image which indicates face coordinate information that is stored in a face position storage area (memory) of the tracking device, to a detected coordinate (position where the face information was detected by the face detection section 21 in S1) (S18). Note that if a face is not detected in an image in S1 (NO in S1), information of the tracking object and the tracing object, each of which is registered in the memory or the like, is deleted from the tracking device (S17), and the process ends. Tracking process in the tracking device 1 is carried out by repetitively carrying out the above processes, as illustrated in FIG. 5.

Figure 6:
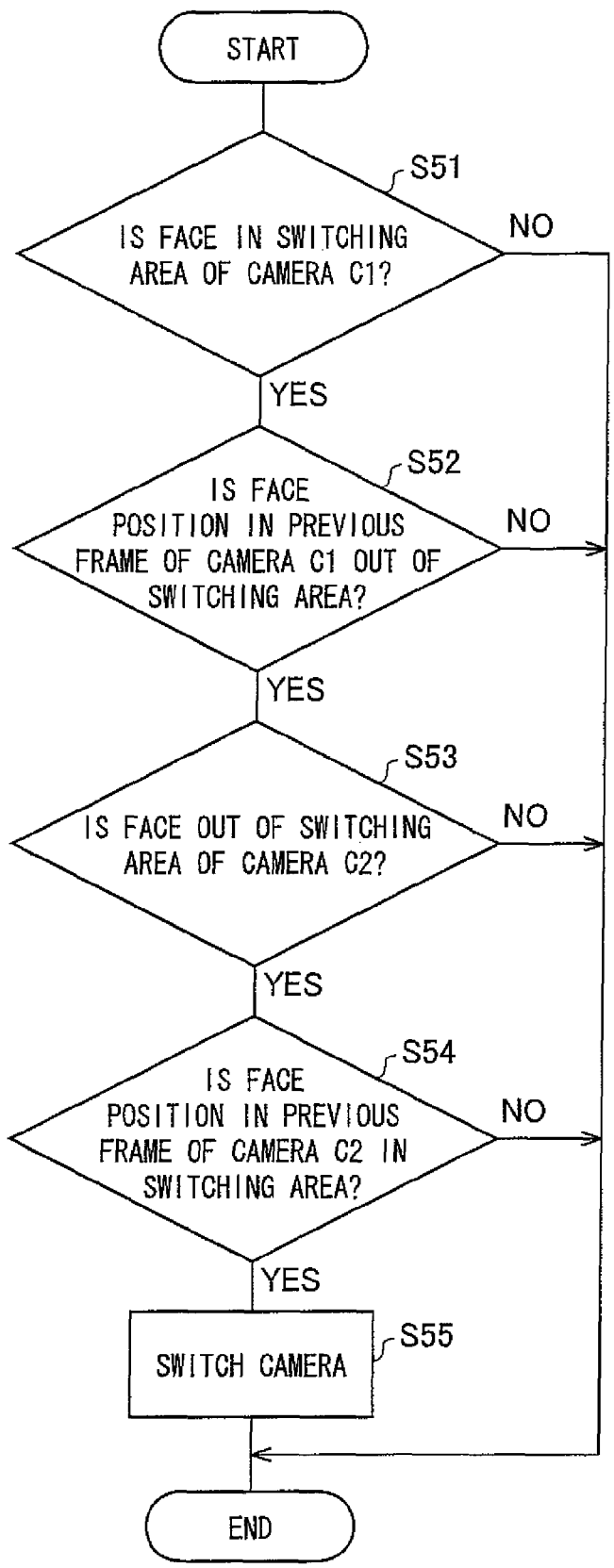
FIG. 6 is a flow chart illustrating a flow of a camera switching process.
Figure 7:
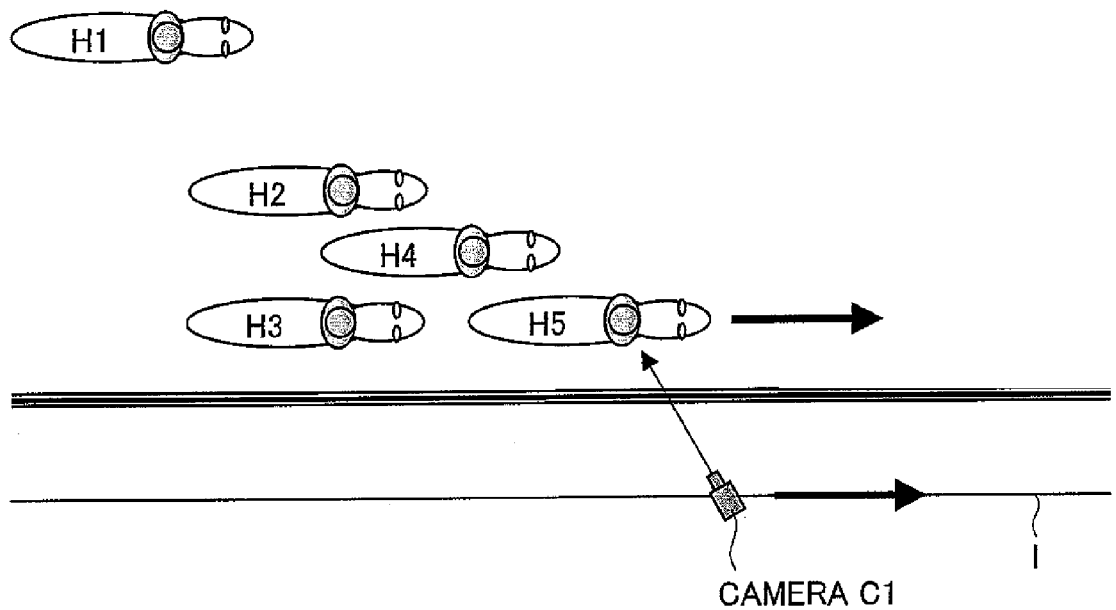
FIG. 7(a) is an image view illustrating an example where a tracking device of the present embodiment is used in relay broadcasting of horse racing.
FIG. 7(b) is an image view illustrating an image captured by a camera shown in FIG. 7(a).
Figure 7:
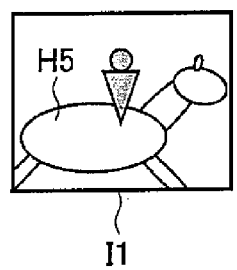
Figure 8:
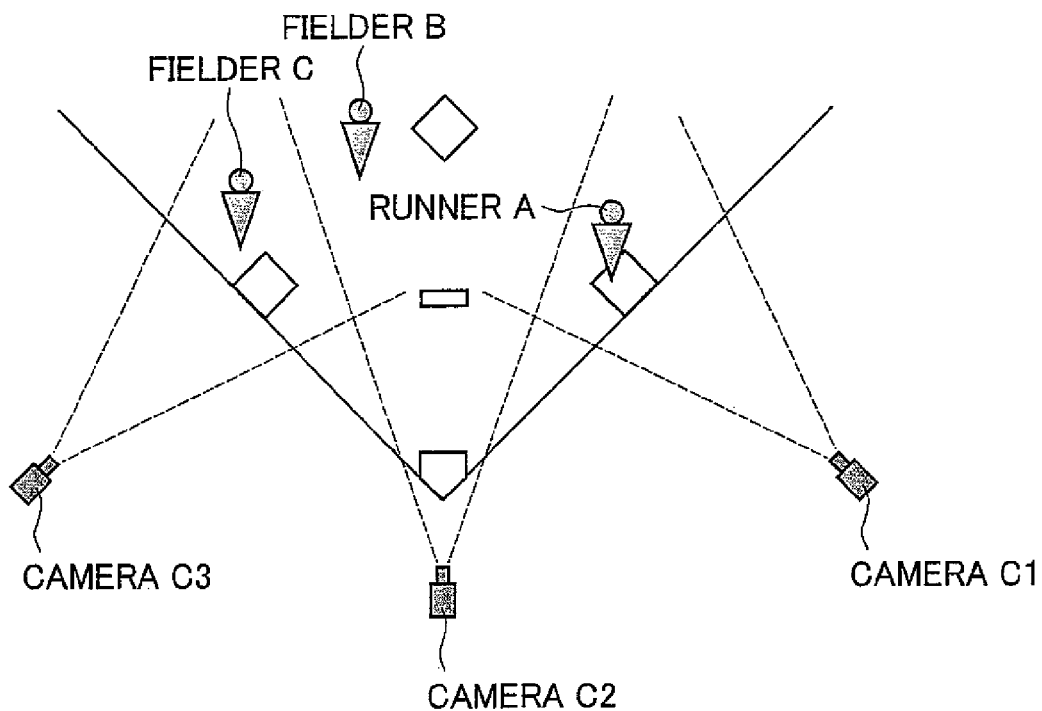
FIG. 8(a) is an image view illustrating an example in which a tracking device of the present embodiment is used in relay broadcasting of a baseball game.
FIG. 8(b) is an image view illustrating an image captured by a camera shown in FIG. 8(a).
FIG. 8(c) is an image view illustrating an image captured by another camera shown in FIG. 8(a).
FIG. 8(d) is an image view illustrating an image captured by still another camera shown in FIG. 8(a).
Figure 8:
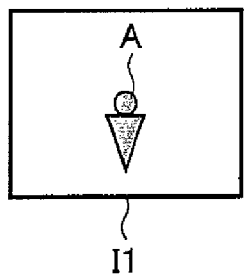
Figure 8:
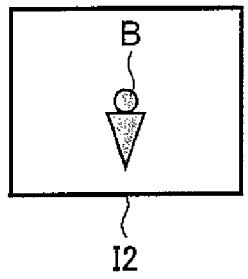
Figure 8:
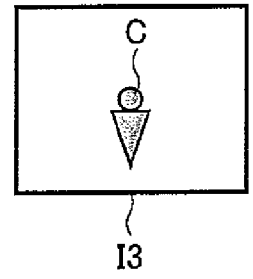

The following description explains a camera switching process in a case where the photographing section 3 has a plurality of cameras, with reference to a flow chart illustrated in FIG. 6. The following description is made assuming that a camera C1 is switched to a camera C2.

As illustrated in FIG. 6, it is determined whether or not a face having a highest priority is included in a switching area (dotted area in FIGS. 4(a) through 4(c)) of the camera C1 (S51). If there are no faces in the area (NO in S51), the process ends. If there is a face in the area (YES in S51), it is determined whether or not a position of the face having the highest priority is outside of the switching area in a previous frame of the camera C1 (S52). If the position is not outside the switching area (NO in S52), the process ends. If the position is outside the switching area (YES in S52), it is determined whether or not a position of the face having the highest priority is outside the switching area of the camera C2 (S53). If there is no such face positioned outside the area (NO in S53), the process ends. If there is the face positioned outside the area (YES in S53), it is determined whether or not the position of the face having the highest priority in the previous frame of the camera C2 is in the switching area or not (S54). If the position of the face is not in the switching area (NO in S54), the process ends. If the position of the face is in the switching area (YES in S54), cameras are switched from the camera C1 to the camera C2 (S55).

The switching of the camera is carried out as above. This switching of cameras between two or more cameras is carried out as similar to this. The switching is controlled so that when a camera which tracks a face that has a highest priority no longer can track the face that has the highest priority, another camera which is capable of tracking the face having the highest priority tracks the face.

EXAMPLE 1

The following description explains the tracking device 1 of the present embodiment, assuming that the tracking device 1 is used in relay broadcasting of horse racing for example, with reference to FIGS. 7(a) and 7(b). In the following description, the photographing device 33 has one camera.

Assume that faces of the horses are registered in the face information DB 41 as face information in advance, and a horse H2 is prioritized as 1, and a horse H5 is prioritized as 2, in an order of popularity. A camera C1 is placed on a rail 1 as illustrated in FIG. 7(a), so as to move in a progressing direction of the horses. In this case, the camera C1 is first controlled so that the horse H5 at the front comes in a center of a photographic image 11. The camera C1 continues to track the horse H5, as illustrated in FIG. 7(b). However, when the horse H2 comes into the photographic image I1, the camera C1 is controlled so that the horse H2 comes in the center of the screen in a subsequent frame.

As such, by setting the priority of tracking in the order of popularity, it is possible to arrange the most popular horse that is recognizable in the photographic image to be in the center of the screen.

Instead of the faces of the horses, faces of jockeys that ride the horses may be used. In such a case, the faces of the jockeys are to be registered in the face information DB 41. The priority may be set in the order of popularity of the jockeys, or the order of popularity of the horses on which the jockeys ride.

EXAMPLE 2

The following description explains the tracking device 1 of the present embodiment, assuming that the tracking device 1 is used in relay broadcasting of a baseball game as illustrated in FIG. 8(a) for example, with reference to FIGS. 8(a) through 8(d). In the following description, the photographing device 33 has three cameras.

Assume that faces of players are registered in the face information DB 41 as face information, and a respective priority is set as runner>batter>fielder.

As illustrated in FIGS. 8(b) through 8(d), the camera C1 tracks a runner A, the camera C2 tracks a fielder B, and the camera C3 tracks a fielder C. The cameras C1 through C3 are controlled so that the respective players are positioned in the center of the screens 11 through 13. The runner A, the fielder B, and the fielder C are tracked by the camera C1, the camera C2, and the camera C3, respectively. When the runner A comes into the angle of view of the camera C2 in base running, the camera C2 brings the runner A to the center of the screen 12. That is to say, the camera C2 switches the tracking object to the runner A. When the runner A runs out from the angle of view, then the tracking object returns to the fielder B. When the runner A comes into the angle of view of the camera C3 in base running, the camera C3 also switches the tracking object to the runner A so that the runner A comes in the center of the screen 13. Once the runner A is out of the screen, the tracking object of the camera C3 returns its tracking object to the fielder C.

As such, it is possible to carry out tracking based on priorities.

Other than the above, in the tracking device 1 of the present embodiment, the priority may be set as: forward>mid fielder>defender>goal keeper, or home players>away players, for example, in the case where the device is used in relay broadcasting of a soccer game. In a case for example where a suspicious person is tracked for security, tracking may be carried out by setting a priority in an order of: a suspect on a wanted list>a person that has a criminal history>other persons. Moreover, for bicycle racing, speedboat racing, car racing, motorbike racing, a marathon, a long-distance relay road race, athletics and the like, tracking may be carried out by setting a priority as: most popular>secondly popular>.... If it is sports relay broadcasting of an amateur baseball, the tracking may be carried out by prioritizing the players in an order of drafting. Note that these are simply exemplifications. How the tracking orders are set is not limited, and the tracking objects are also not limited.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

Finally, the blocks of the tracking device 1, particularly the control section 2, may be realized by way of hardware or software as executed by a CPU as follows:

The tracking device 1 includes a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The object of the present invention can also be achieved by mounting to the tracking device 1 a computer-readable recording medium containing control program code (executable program, intermediate code program, or source program) for the tracking device 1, which is software realizing the aforementioned functions, in order for the computer (or CPU, MPU) to retrieve and execute the program code contained in the recording medium.

The recording medium may be, for example, a tape, such as a magnetic tape or a cassette tape; a magnetic disk, such as a Floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The tracking device 1 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth, 802.11 wireless, HDR, mobile telephone network, satellite line, or terrestrial digital network. The present invention encompasses a carrier wave or data signal transmission in which the program code is embodied electronically.

INDUSTRIAL APPLICABILITY

The invention is applicable to systems which track a plurality of subjects, and is applicable for various purposes, for example, a security system, or for example, teleconferences, televised lectures, and sports broadcasting.

The invention claimed is:

1. A tracking device which tracks a tracking object by controlling a photographing section so as to continuously include the tracking object in a photographic image, the tracking device comprising:
   a feature information detection section that detects feature information from a current photographic image;
   a storage section that registers tracking object information in which feature information of a plurality of figures are registered so that the feature information corresponds to a priority indicating tracking order of the feature information;
   a tracking object matching section that (i) compares the feature information thus detected with the tracking object information registered in the storage section, and (ii) determines whether or not the feature information thus detected is information of the tracking object;
   a priority acquisition section that acquires the priority of the feature information thus detected from the tracking object information, in the case where it is determined that the feature information thus detected is the information of the tracking object; and
   a control section that controls the photographing section, based on the priority thus acquired, so as to include, in a subsequent photographic image, continuously from the current photographic image from which a plurality of the feature information serving as the tracking objects is detected, feature information that has a highest priority in the current photographic image,
   wherein the feature information detection section, when detecting the feature information of the tracking object from a previous photographic image but not detecting the feature information from the current photographic image, excludes that feature information from the tracking objects.

2. The tracking device as set forth in claim 1, further comprising a position recognition section that continuously recognizes, in the current photographic image, a position of the feature information thus detected by the feature information detection section,
   wherein the tracking object matching section skips the matching when (i) the feature information detection section detects same feature information, in a current photographic image which is subsequently obtained, as the feature information, which has been detected by the feature information detection section from a previous photographic image, and (ii) the position recognition section recognizes the position of the feature information in the photographic image.

3. The tracking device as set forth in claim 2,
   wherein the photographing section includes a plurality of photographing devices, and wherein the control section controls the photographing section so that, when one of the photographing devices that has tracked feature information having the highest priority can no longer track the feature information having the highest priority, another one of the photographing devices that can track the feature information having the highest priority tracks the feature information having the highest priority.

4. The tracking device as set forth in claim 2, further comprising:
an input section via which a user is able to set and change a priority in the tracking object information.

5. The tracking device as set forth in claim 2,
wherein the tracking object matching section (i) finds a similarity between the feature information detected by the feature information detection section and the feature information included in the tracking object information, (ii) determines, in a case where the similarity thus found is greater than a predetermined authentication threshold value, that the feature information thus detected is information of a tracking object and (iii) finds authentication reliability indicative of how large the similarity thus found is as compared with the predetermined authentication threshold value, and
wherein in a case where the photographic image includes a plurality of feature information having an identical priority, the control section controls the photographing section so that one of the plurality of feature information, which has a greater authentication reliability, is continuously included in the photographic image.

6. The tracking device as set forth in claim 2, further comprising:
a memory that registers to which of a tracing object, a tracking object having a highest priority, or a tracking object having a lower priority, the feature information belongs,
wherein the tracking object matching section matches new feature information other than the feature information included in the previous photographic image among the detected feature information with the tracking object information stored in the storage section, and registers into the memory the new feature information not included in the tracking object information as feature information of the tracing object,
wherein the priority acquisition section acquires, from the tracking object information, a priority of the new feature information, and in a case in which the new feature information has a lower priority than the feature information of the tracking object having the highest priority, the priority acquisition section registers the new feature information in the memory as feature information of a tracking object having a lower priority, and in a case in which the new feature information has a higher priority than the feature information of the tracking object having the highest priority, the priority acquisition section changes the feature information of the tracking object having the highest priority to feature information of a tracking object having a lower priority and registers this in the memory, and registers the new feature information in the memory as the feature information of a tracking object having the highest priority,
wherein the control section controls the photographing section so that the feature information of the tracking object having the highest priority registered in the memory is continuously included in the subsequent photographic image, and
wherein the feature information detection section deletes feature information that was detected from the previous photographic image, but is not detected in the current photographic image, and further in a case in which the feature information to be deleted is feature information of the tracking object having the highest priority, feature information of a tracking object having a highest priority among the feature information of the tracking object having the lower priority is changed to the feature information of the tracking object having the highest priority and is registered in the memory.

7. The tracking device as set forth in claim 1,
wherein the photographing section includes a plurality of photographing devices, and
wherein the control section controls the photographing section so that, when one of the photographing devices that has tracked feature information having the highest priority can no longer track the feature information having the highest priority, other one of the photographing devices that can track the feature information having the highest priority tracks the feature information having the highest priority.

8. The tracking device as set forth in claim 7, further comprising:
an input section via which a user is able to set and change a priority in the tracking object information.

9. The tracking device as set forth in claim 7,
wherein the tracking object matching section (i) finds a similarity between the feature information detected by the feature information detection section and the feature information included in the tracking object information, (ii) determines, in a case where the similarity thus found is greater than a predetermined authentication threshold value, that the feature information thus detected is information of a tracking object and (iii) finds authentication reliability indicative of how large the similarity thus found is as compared with the predetermined authentication threshold value, and
wherein in a case where the photographic image includes a plurality of feature information having an identical priority, the control section controls the photographing section so that one of the plurality of feature information, which has a greater authentication reliability, is continuously included in the photographic image.

10. The tracking device as set forth in claim 1, further comprising:
an input section via which a user is able to set and change a priority in the tracking object information.

11. The tracking device as set forth in claim 10,
wherein the tracking object matching section (i) finds a similarity between the feature information detected by the feature information detection section and the feature information included in the tracking object information, (ii) determines, in a case where the similarity thus found is greater than a predetermined authentication threshold value, that the feature information thus detected is information of a tracking object and (iii) finds authentication reliability indicative of how large the similarity thus found is as compared with the predeteunined authentication threshold value, and
wherein in a case where the photographic image includes a plurality of feature information having an identical priority, the control section controls the photographing section so that one of the plurality of feature information, which has a greater authentication reliability, is continuously included in the photographic image.

12. The tracking device as set forth in claim 1,
wherein the tracking object matching section (i) finds a similarity between the feature information detected by the feature information detection section and the feature information included in the tracking object information, (ii) determines, in a case where the similarity thus found is greater than a predetermined authentication threshold value, that the feature information thus detected is information of a tracking object and (iii) finds authentication reliability indicative of how large the similarity thus found is as compared with the predetermined authentication threshold value, and
wherein in a case where the photographic image includes a plurality of feature information having an identical priority, the control section controls the photographing section so that one of the plurality of feature information, which has a greater authentication reliability, is continuously included in the photographic image.

13. The tracking device as set forth in claim 12,
wherein the plurality of feature information having identical priorities matches the tracking object information for each of different feature information of the plurality of feature information.

14. The tracking device as set forth in claim 1, wherein:
the control section controls the photographing section so that at least one of a size and a position of the feature information that has the highest priority is always fixed in the photographic image.

15. The tracking device as set forth in claim 1,
wherein the feature information is face information that specifies features of a face of a figure, and
wherein the feature information detection section determines whether or not a face of a figure is in the current photographic image.

16. A tracking method for tracking a tracking object by controlling a photographing section so as to continuously include the tracking object in a photographic image, the tracking method comprising the steps of:
detecting feature information from a current photographic image;
comparing the feature information thus detected with tracking object information in which feature information of a plurality of figures is registered in a storage section so that the feature information corresponds to a priority indicating tracking order of the feature information;
determining whether or not the feature information thus detected is information of the tracking object;
acquiring the priority of the feature information thus detected from the tracking object information, in the case where it is determined that the feature information thus detected is the information of the tracking object; and
controlling the photographing section, based on the priority thus acquired, so as to include, in a subsequent photographic image, continuously from the current photographic image from which a plurality of the feature information serving as tracking objects is detected, feature information that has a highest priority in the current photographic image,
wherein the step of detecting, when detecting the feature information of the tracking object from a previous photographic image but not detecting the feature information from the current photographic image, excludes that feature information from the tracking objects.

17. A non-transitory computer-readable recording medium wherein a tracking device control program is recorded, the tracking device control program being for operating a tracking device that tracks a tracking object by controlling a photographing section so as to continuously include the tracking object in a photographic image, the tracking device comprising:
a feature information detection section that detects feature information from a current photographic image;
a storage section that registers tracking object information in which feature information of a plurality of figures is registered so that the feature information corresponds to a priority indicating tracking order of the feature information;
a tracking object matching section that (i) compares the feature information thus detected with the tracking object information registered in the storage section, and (ii) determines whether or not the feature information thus detected is information of the tracking object;
a priority acquisition section that acquires the priority of the feature information thus detected from the tracking object information, in the case where it is determined that the feature information thus detected is the information of the tracking object; and
a control section that controls the photographing section, based on the priority thus acquired, so as to include, in a subsequent photographic image, continuously from the current photographic image from which a plurality of the feature information serving as the tracking objects are detected, feature information that has a highest priority in the current photographic image,
wherein the feature information detection section, when detecting the feature information of the tracking object from a previous photographic image but not detecting the feature information from the current photographic image, excludes that feature information from the tracking objects.

* * * * *

UNITED STATES PATENT AND TRADEMARK OFFICE
CERTIFICATE OF CORRECTION

| | | |
|---|---|---|
| PATENT NO. | : 8,599,267 B2 | |
| APPLICATION NO. | : 12/282632 | |
| DATED | : December 3, 2013 | |
| INVENTOR(S) | : Kuwano et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1315 days.

Signed and Sealed this
Thirty-first Day of March, 2015

Michelle K. Lee
*Director of the United States Patent and Trademark Office*